US012728567B2

(12) United States Patent
Hu

(10) Patent No.: US 12,728,567 B2
(45) Date of Patent: Sep. 8, 2026

(54) MANUFACTURING METHOD FOR SEALING GASKET, AND MOLD

(71) Applicant: HANGZHOU AO KE MEI RUI TECHNOLOGY CO., LTD., Hangzhou (CN)

(72) Inventor: Meiyan Hu, Hangzhou (CN)

(73) Assignee: HANGZHOU AO KE MEI RUI TECHNOLOGY CO., LTD., Hangzhou (CN)

( * ) Notice: Subject to any disclaimer, the term of this patent is extended or adjusted under 35 U.S.C. 154(b) by 183 days.

(21) Appl. No.: 18/551,864

(22) PCT Filed: Sep. 26, 2021

(86) PCT No.: PCT/CN2021/120570

§ 371 (c)(1),
(2) Date: Sep. 21, 2023

(87) PCT Pub. No.: WO2022/198957

PCT Pub. Date: Sep. 29, 2022

(65) Prior Publication Data

US 2024/0173899 A1 May 30, 2024

(30) Foreign Application Priority Data

Mar. 24, 2021 (CN) ......................... 202110314327.6

(51) Int. Cl.
*B29C 35/02* (2006.01)
*B29C 45/00* (2006.01)
(Continued)

(52) U.S. Cl.
CPC .......... *B29C 35/02* (2013.01); *B29C 45/0055* (2013.01); *B29C 45/14311* (2013.01);
(Continued)

(58) Field of Classification Search
CPC ........ B29C 45/0055; B29C 2045/0077; B29C 2045/14319; B29C 35/02; B29C 2793/009; B29D 99/0053
See application file for complete search history.

(56) References Cited

U.S. PATENT DOCUMENTS 4,133,927 A 1/1979 Tomoda
11,156,300 B2 * 10/2021 Bunda .................. F16K 27/065
(Continued)

FOREIGN PATENT DOCUMENTS

CN 103909595 A 7/2014
JP S5251480 A 4/1977
(Continued)

OTHER PUBLICATIONS

Takeshi (Machine Translation of JP09193170) (Year: 1997).*
(Continued)

*Primary Examiner* — Michael A Tolin
*Assistant Examiner* — Hana C Page
(74) *Attorney, Agent, or Firm* — Yue (Robert) Xu; Apex Attorneys at Law, LLP

(57) ABSTRACT

A manufacturing method for a sealing gasket includes the following steps: S1, preparing raw material rubber and a first component, wherein the first component comprises a base body and a gluing layer, the gluing layer is attached to an upper surface of the base body; S2, placing the first component in an inner cavity of a forming mold, wherein the forming mold comprises an upper mold, a first main body surface of the upper mold is arc shaped, the forming mold further comprises a lower mold, and a second main body surface of the lower mold is arc shaped; S3, placing the raw material rubber in the inner cavity of the forming mold; and S4, vulcanizing the raw material rubber arranged in the inner
(Continued)

cavity of the forming mold, such that the raw material rubber and the first component are integrated.

16 Claims, 6 Drawing Sheets

(51) Int. Cl.

| | |
|---|---|
| ***B29C 45/14*** | (2006.01) |
| ***B29C 70/68*** | (2006.01) |
| ***B29K 27/18*** | (2006.01) |
| ***B29L 31/26*** | (2006.01) |

(52) U.S. Cl.

CPC .... *B29C 70/683* (2013.01); *B29C 2045/0077* (2013.01); *B29C 2793/0018* (2013.01); *B29C 2793/009* (2013.01); *B29K 2027/18* (2013.01); *B29L 2031/265* (2013.01)

(56) References Cited

U.S. PATENT DOCUMENTS

| | | | | |
|---|---|---|---|---|
| 12,030,990 | B2 * | 7/2024 | Hellbach | F16J 15/3284 |
| 2008/0157486 | A1 | 7/2008 | Kuzawa et al. | |
| 2018/0292016 | A1 * | 10/2018 | Ledvora | F16K 5/0471 |
| 2021/0395453 | A1 | 12/2021 | Hellbach et al. | |

FOREIGN PATENT DOCUMENTS

| | | | |
|---|---|---|---|
| JP | S5838139 | A | 3/1983 |
| JP | S63293045 | A | 11/1988 |
| JP | H01120484 | A | 5/1989 |
| JP | H02124767 | A | 5/1990 |
| JP | H03277517 | A | 12/1991 |
| JP | H09193170 | A | 7/1997 |
| JP | H10323847 | A | 12/1998 |
| JP | 2008164079 | A | 7/2008 |
| WO | 02094536 | A1 | 11/2002 |
| WO | 2020074349 | A1 | 4/2020 |

OTHER PUBLICATIONS

Machine Translation of JP-H0112484-B2, Suzuki Norijiro (Year: 1989).*

Machine Translation of JPS63293045, Takehana Tsutomu (Year: 1988).*

Japanese first Office Action issued on Oct. 22, 2024 for this Japanese counterpart application No. 2023-558601.

International Search Report for PCT/CN2021/120570 mailed Dec. 14, 2021, ISA/CN.

Chinese First Office Action issued on Feb. 13, 2026 for Chinese counterpart application No. 202180096154.3.

* cited by examiner

MANUFACTURING METHOD FOR SEALING GASKET, AND MOLD

This application claims the priority of the Chinese Patent Application No. 202110314327.6, titled "MANUFACTURING METHOD FOR SEALING GASKET, AND MOLD", filed on Mar. 24, 2021 with the China National Intellectual Property Administration, which is incorporated herein by reference in its entirety.

FIELD

The present application relates to the technical field of manufacture of sealing members, and in particular to a method for manufacturing a sealing gasket and a mold.

BACKGROUND

A sealing gasket is widely used as a sealing member, and a material for making the sealing gasket includes rubber. Generally, with the rubber's elasticity, the sealing gasket can have a sealing effect. In some application scenarios, a moving part may move relative to the sealing gasket, so a friction may occur between contact surfaces of the sealing gasket and the moving part, which may have an impact on a movement of the moving part. Therefore, it is a technical problem to be solved how to manufacture a sealing member that can satisfy both sealing performance and reduced friction force against the moving part and to manufacture a mold corresponding to the sealing member.

SUMMARY

An object of the present application is to provide a method for manufacturing a sealing gasket satisfying both sealing performance and reduced friction force against the moving part.

Another object of the present application is to provide a mold which is used as a carrier for manufacturing the above-mentioned sealing member.

In order to achieve the above objects, the following technical solution is provided according to an embodiment of the present application.

A method for manufacturing a sealing gasket includes the following steps:

- S1: preparing raw material rubber and a first component, where the first component includes a substrate and an adhesive coating layer, the adhesive coating layer is attached to an upper surface of the substrate, and the material of the substrate includes a lubricating material;
- S2: placing the first component in an inner chamber of a forming mold, where the forming mold includes an upper mold, the upper mold is provided with a first main body surface which is arc-shaped, and at least part of the first main body surface forms at least part of an upper wall surface of the inner chamber of the forming mold; the forming mold further includes a lower mold, where the lower mold is provided with a second main body surface which is arc-shaped, and at least part of the second main body surface forms at least part of a lower wall surface of the inner chamber of the forming mold; and the adhesive coating layer of the first component faces towards the upper mold of the forming mold;
- S3: placing the raw material rubber in the inner chamber of the forming mold; and
- S4: vulcanizing the raw material rubber placed in the inner chamber of the forming mold, such that the raw material rubber and the first component are integrated with each other.

A mold used as a carrier for manufacturing the sealing member includes a lower mold and an upper mold, where the lower mold and the upper mold together define at least one inner chamber, and the inner chamber includes an accommodating cavity for accommodating raw materials required for forming the sealing gasket; the upper mold is provided with a first main body surface which is arc-shaped, and at least part of the first main body surface forms at least part of an upper wall surface of the inner chamber of the mold; the mold further includes a lower mold, where the lower mold is provided with a second main body surface which is arc-shaped, and at least part of the second main body surface forms at least part of a lower wall surface of the inner chamber of the mold.

In the method for manufacturing the sealing gasket disclosed according to the present application and through the above process, on the one hand, the vulcanized raw material rubber has elasticity, which enables the sealing gasket to achieve a sealing effect, and on the other hand, since the material of the substrate in the first component includes lubricating material, it is beneficial to reducing a friction force against the moving part. Therefore, the sealing gasket satisfying both sealing performance and reduced friction force against the moving part can be manufactured through the method for manufacturing the sealing gasket described above.

In the mold disclosed according to the present application, the upper mold is provided with a first main body surface which is arc-shaped, and at least part of the first main body surface forms at least part of an upper wall surface of the inner chamber of the mold. The mold further includes a lower mold, where the lower mold is provided with a second main body surface which is arc-shaped, and at least part of the second main body surface forms at least part of a lower wall surface of the inner chamber of the mold. In this way, on the one hand, the mold can be used as the carrier for manufacturing the sealing gasket, and on the other hand, the main body of the sealing gasket manufactured by the mold is arc-shaped, so that a matching degree between the manufactured sealing member and the sealing member in actual use can be improved.

DETAILED DESCRIPTION OF THE EMBODIMENTS

The present application will be described in detail hereinafter in conjunction with the drawings and specific embodiments.

The specific embodiments of the present application are described in detail hereinafter in conjunction with the drawings. First of all, it should be noted that the location terms, such as upper, lower, left, right, front, rear, inside, outside, top and bottom, mentioned or possibly mentioned in this specification are relative concepts defined based on those constructs shown in the corresponding drawings, and therefore may vary with locations or states of use. Therefore, these and other location terms should not be construed as restrictive terms.

Figure 1:
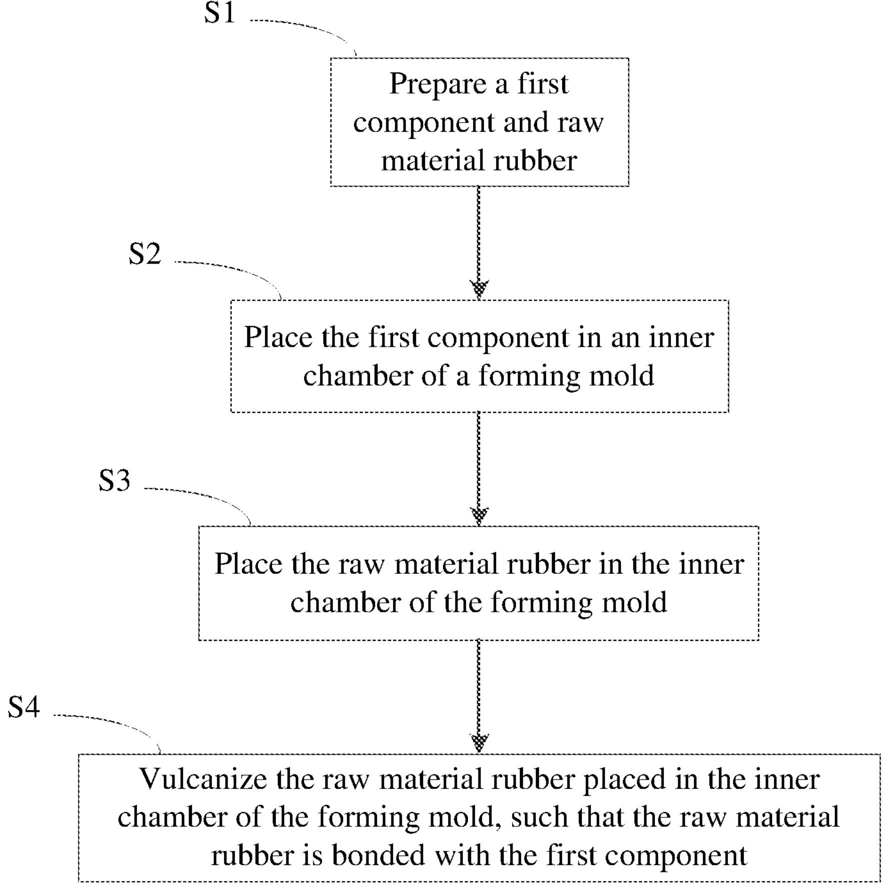
FIG. 1 is a schematic flowchart of a method for manufacturing a sealing gasket according to a first embodiment of the present application.

With reference to FIG. 1, FIG. 1 shows a method for manufacturing a sealing gasket according to a first embodiment, which will be described below.

With reference to FIG. 1, the method for manufacturing the sealing gasket includes following steps.

S1: preparing raw material rubber and a first component, where the first component includes a substrate and an adhesive coating layer, the adhesive coating layer is attached to an upper surface of the substrate, and the material of the substrate includes a lubricating material. In this embodiment, the substrate may be a plastic layer, and the lubricating material may be mainly polytetrafluoroethylene (PTFE). In other embodiments, the lubricating material may also be mainly a copolymer of a small amount of perfluoropropyl perfluorovinyl ether and polytetrafluoroethylene (PFA).

S2: placing the first component in an inner chamber of a forming mold, where the forming mold includes an upper mold, the upper mold is provided with a first main body surface which is arc-shaped, and at least part of the first main body surface forms at least part of an upper wall surface of the inner chamber of the forming mold; the forming mold further includes a lower mold, where the lower mold is provided with a second main body surface which is arc-shaped, and at least part of the second main body surface forms at least part of a lower wall surface of the inner chamber of the forming mold; a lower surface of the substrate of the first component is in contact with the second main body surface, and the adhesive coating layer of the first component faces towards the upper mold of the forming mold, that is, an upper surface of the adhesive coating layer of the first component is used as an adhesive surface. In this embodiment, the lower surface of the substrate of the first component is used to contact with an external moving part.

S3: placing the raw material rubber of a preset specification in the inner chamber of the forming mold, where the raw material rubber placed in the inner chamber of the forming mold is in contact with the adhesive coating layer of the first component.

S4: vulcanizing the raw material rubber placed in the inner chamber of the forming mold, such that the vulcanized raw material rubber is in contact with the second main body surface and is bonded with the adhesive coating layer of the first component into a whole.

Through the above process, on the one hand, the vulcanized raw material rubber has elasticity, which enables the sealing gasket to achieve a sealing effect, and on the other hand, since the material of the substrate in the first component includes lubricating material, it is beneficial to reducing a friction force against the moving part. Therefore, the sealing gasket satisfying both sealing performance and reduced friction force against the moving part can be manufactured through the method for manufacturing the sealing gasket described above.

Each of the above steps will be described in further detail below.

With reference to FIG. 1, in this embodiment, the first component is flexible, and the first component has a thickness greater than or equal to 0.2 mm and less than or equal to 0.6 mm. For example, the thickness of the first component may be 0.4 mm or 0.5 mm. In this embodiment, if the thickness of the first component is too large, the sealing performance may be affected, and if the thickness of the first component is too small, wrinkles and deformation may easily occur in step S4. In addition, it should be noted here that a value mentioned in the present application may be an accurate value or a rounded value. In addition, a corresponding coverage area of the raw material rubber on the first component is less than or equal to a surface area of the adhesive coating layer of the first component.

With reference to FIG. 1, in this embodiment and in step S1, the material of the substrate includes polytetrafluoroethylene, and the first component is in a flat form.

In step S1, before coating the substrate of the first component with an adhesive, a surface treatment, in particular, a sodium naphthalene treatment or rubbing, is performed on a surface of the substrate of the first component for coating, which is beneficial to improving the adhesive force between the adhesive coating layer and the substrate of the first component. The adhesive coating layer may include a base adhesive layer and a top adhesive layer, where the base adhesive layer is first coated on the upper surface of the substrate, and after the base adhesive layer is dried, the top adhesive layer is coated on a surface of the base adhesive layer and then the top adhesive layer is to be dried. The "drying" referred to herein may be drying by natural air, or auxiliary drying such as oven drying, air drying and the like. In this embodiment, the adhesive can be reliably bonded with the substrate of the first component by coating the base adhesive layer, and the dried base adhesive layer can be reliably bonded with the vulcanized rubber by coating the top adhesive layer. In this embodiment, the base adhesive layer and the top adhesive layer are different types of adhesives. In other embodiments, it is also possible to coat only one layer of the adhesive on the upper surface of the substrate, which corresponds to only one type of the adhesive.

In step S3, the method for placing the raw material rubber of a preset specification in the inner chamber of the forming mold includes the following two ways. In the first way, the raw material rubber of the preset specification is placed into a tank of the forming mold, and a press column of a vulcanizing machine extrudes the raw material rubber in the tank into a feed port of the inner chamber of the forming mold, through which the raw material rubber is in turn extruded into the inner chamber of the forming mold. In this embodiment, before the raw material rubber of the preset specification is placed into the tank of the forming mold, the tank of the forming mold has a certain temperature, and the temperature of the tank is lower than or equal to a first preset temperature in step S4. Here, a pressure for extruding the raw material rubber into the inner chamber of the forming mold is greater than or equal to 8 MPa and less than or equal to 10 Mpa.

In the second way, the raw material rubber is placed into a barrel of an injection molding machine where the raw material rubber is pre-heated to a second preset temperature, and the second preset temperature is lower than or equal to the first preset temperature. Then, a screw of the injection molding machine injects the raw material rubber in the barrel of the injection molding machine into a gate of the forming mold, so that the raw material rubber is injected into the inner chamber of the forming mold through the gate of the forming mold. When the raw material rubber injected into the inner chamber of the forming mold reaches a preset weight, the injection is stopped. The method for placing the raw material rubber of the preset specification into the inner chamber of the forming mold may also be realized in other ways.

In addition, in the above two ways, the raw material rubber of the preset specification refers to the raw material rubber of a preset weight. In other embodiments, the raw material rubber of a preset specification may also refer to the raw material rubber of a preset volume or a preset size.

In step S4, the corresponding vulcanization time is defined to be a first preset time, and the corresponding preset temperature is defined to be a first preset temperature. The first preset time is longer than or equal to 3 minutes and shorter than or equal to 5 minutes, and the first preset temperature is higher than or equal to 170° C. and lower than or equal to 200° C.

In step S4, maintaining the vulcanization temperature of the raw material rubber and the first component placed in the inner chamber of the forming mold at the first preset temperature includes the following three ways. In the first way, the raw material rubber and the first component in the inner chamber of the forming mold are heated to reach the first preset temperature. In the second way, before the raw material rubber and the first component are placed in the forming mold, the molding chamber of the forming mold has already reached the first preset temperature. In the third way, before the raw material rubber and the first component are placed in the forming mold, the molding chamber of the forming mold has had a certain temperature which is lower than the first preset temperature, and after the raw material rubber and the first component are placed in the molding chamber of the forming mold, both of them are heated to reach the first preset temperature.

Step S4 further includes discharging air in the inner chamber of the forming mold at least once, which is beneficial to preventing air holes from appearing in the finished sealing gasket. Specific operations may include the following ways. In the first way, the upper mold and/or the lower mold of the forming mold is opened, so that a gap occurs between the upper mold and the lower mold of the forming mold, and the air in the inner chamber of the forming mold can be discharged from the gap between the upper mold and the lower mold. Then, the upper mold and the lower mold of the forming mold are closed after a preset time. Here, the number of times of opening the upper mold and/or the lower mold of the forming mold for discharging the air may be one or more than one. If the number of times of opening the upper mold and/or the lower mold of the forming mold for discharging the air is more than one, the number of times can be set based on the time or amount of rubber injection. In the second way, an exhaust valve is installed outside the forming mold, and an exhaust hole is defined in the forming mold. The exhaust hole is in communication with the exhaust valve, so that the air in the inner chamber of the forming mold can be discharged through the exhaust valve without opening the upper mold and/or the lower mold of the forming mold, which is beneficial to saving manufacturing time. In the third way, the inner chamber of the forming mold is vacuumed.

Figure 2:
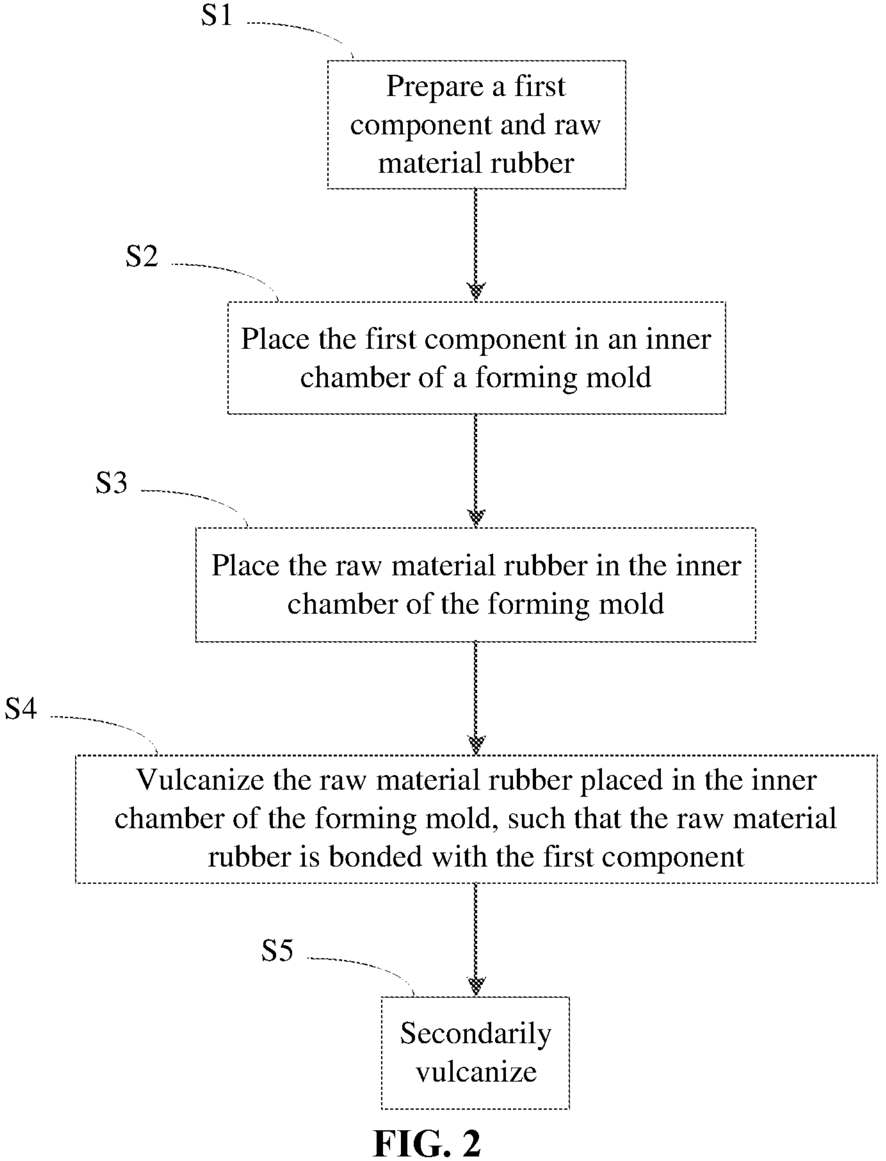
FIG. 2 is a schematic flowchart of a method for manufacturing a sealing gasket according to a second embodiment of the present application.

With reference to FIG. 2, FIG. 2 shows a method for manufacturing a sealing gasket according to a second embodiment, which will be described in detail below.

With reference to FIG. 2, in this embodiment, the method for manufacturing the sealing gasket includes step S1 to step S5, where step S1 to step S4 can be referred to the first embodiment, and will not be repeated here.

With reference to FIG. 2, in this embodiment, the method for manufacturing the sealing gasket further includes the following step:

S5: placing a cooled intermediate product in a container, and heating the intermediate product placed in the container, where a bonded combination of the vulcanized raw material rubber and the first component is defined as the intermediate product; and maintaining the intermediate product placed in the container at a third preset temperature for a second preset time, so that the intermediate product is secondarily vulcanized, where the third preset temperature is lower than the first preset temperature. Here, molecular motions of the rubber become relatively stable due to cooling of the intermediate product. The cooling method here may be natural air cooling, wind cooling, water cooling or the like.

Figure 3:
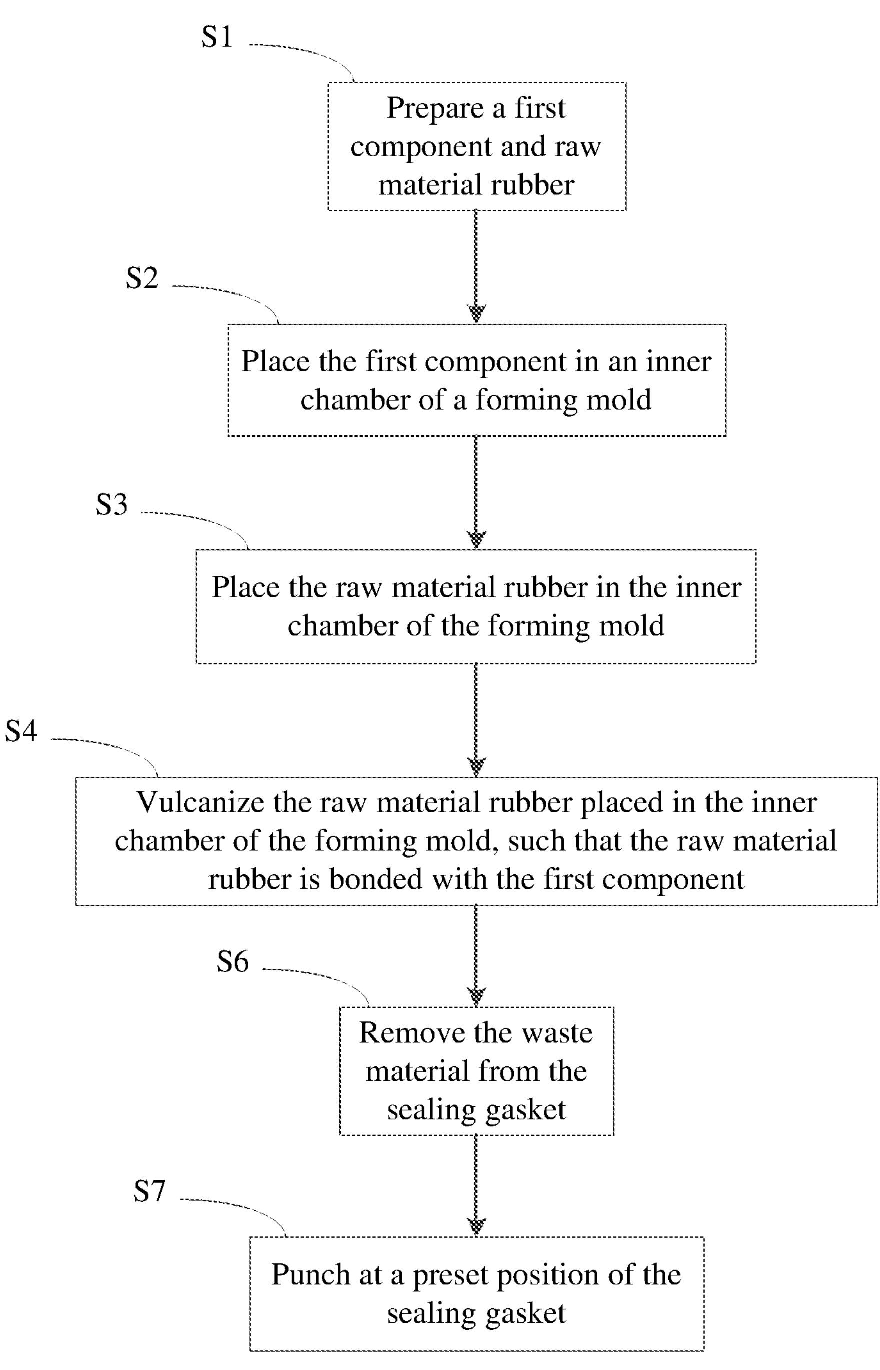
FIG. 3 is a schematic flowchart of a method for manufacturing a sealing gasket according to a third embodiment of the present application.

In the above step S5, the second preset time is longer than or equal to 2 hours and shorter than or equal to 4 hours, and the third preset temperature is higher than or equal to 140° C. and lower than or equal to 160° C. The mechanical properties of the rubber can be further improved through the secondary vulcanization. In other embodiments, secondary vulcanization may not be performed, and parameters such as vulcanization time and vulcanization temperature of primary vulcanization may be adjusted correspondingly. With reference to FIG. 3, FIG. 3 shows a method for manufacturing a sealing gasket according to a third embodiment, which will be described in detail below.

With reference to FIG. 3, in this embodiment, the method for manufacturing the sealing gasket includes step S1 to step S4 as well as step S6 and step S7, where step S1 to step S4 can be referred to the first embodiment, and will not be repeated here.

With reference to FIG. 3, in this embodiment, the method for manufacturing the sealing gasket further includes the following step:

S6: removing the waste material from the sealing gasket; and

S7: punching at a preset position of the sealing gasket. In this embodiment, the sealing gasket includes multiple through holes which are through along a thickness direction of the sealing gasket and are formed by punching at the preset positions of the sealing gasket.

In this embodiment, step S6 is performed before step S7. In other embodiments, step S7 may be performed before step S6. In addition, in this embodiment, the method for manufacturing the sealing gasket includes step S6 and step S7. In other embodiments, the method may include only one of step S6 and step S7.

In addition, it is also possible to cool the intermediate product subjected to the secondary vulcanization before the above step S6, which is beneficial to making the molecular motions of the rubber relatively stable. The cooling method here may be natural air cooling, wind cooling, water cooling or the like. In other embodiments, cooling may be performed after step S6 or step S7.

Figure 4:
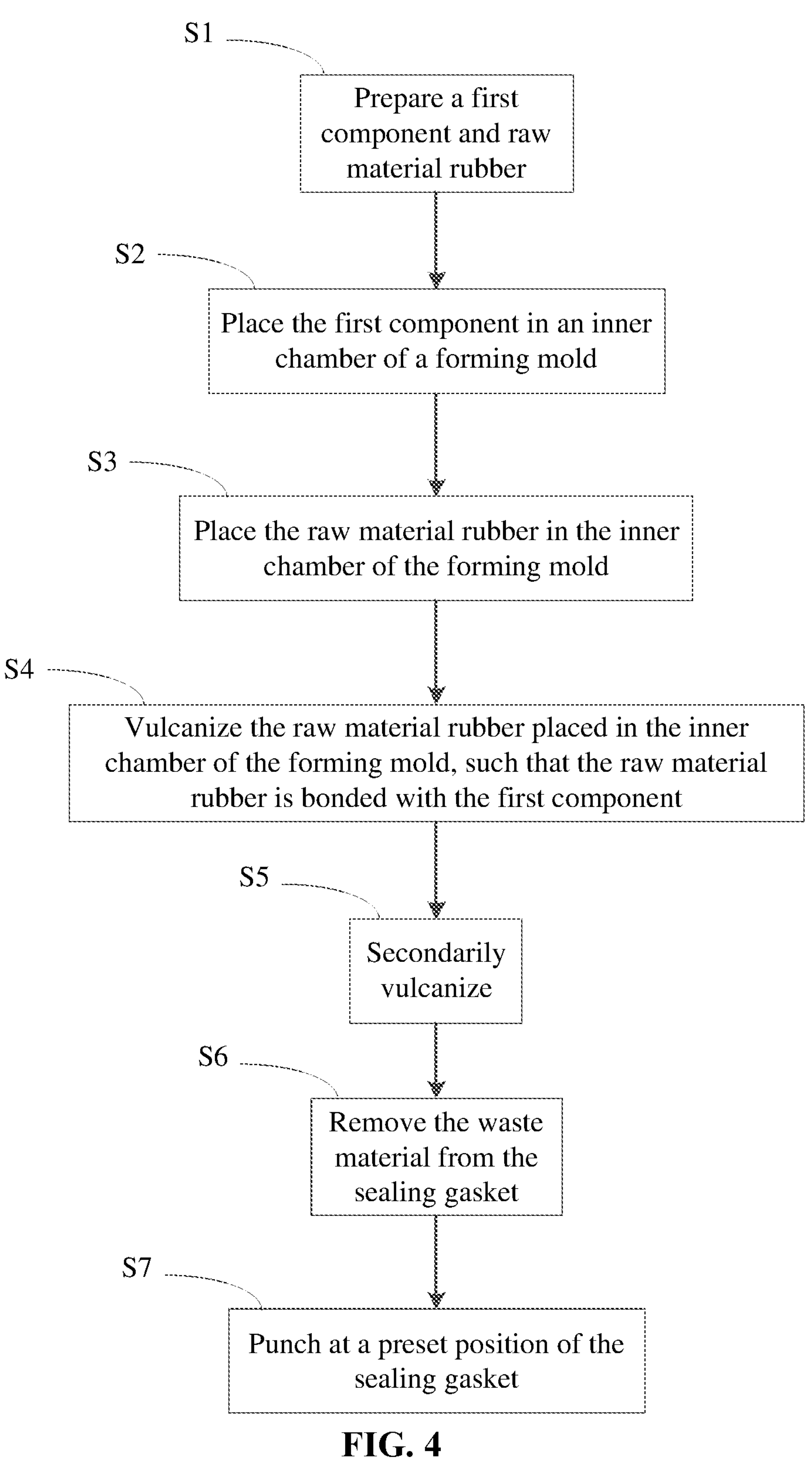
FIG. 4 is a schematic flowchart of a method for manufacturing a sealing gasket according to a fourth embodiment of the present application.

With reference to FIG. 4. FIG. 4 shows a method for manufacturing a sealing gasket according to a fourth embodiment, which will be described in detail below.

With reference to FIG. 4, in this embodiment, the method for manufacturing the sealing gasket includes step S1 to step S7, where step S1 to step S5 can be referred to the second embodiment, and will not be repeated here.

With reference to FIG. 4, in this embodiment, the method for manufacturing the sealing gasket further includes the following step:

S6: removing the waste material from the sealing gasket; and

S7: punching at a preset position of the sealing gasket. In this embodiment, the sealing gasket includes multiple through holes which are through along a thickness direction of the sealing gasket and are formed by punching at the preset positions of the sealing gasket.

Specifically, in step S6, the sealing gasket is placed in a stamping device, where the rubber layer of the sealing gasket is supported on and in contact with a lower stamping die, the first component faces towards an upper stamping die, and a through hole is formed at a preset position of the sealing gasket through a stamping action of the upper stamping die towards the lower stamping die. The part of the sealing gasket forming the through hole is in a closed form around the through hole.

In this embodiment, step S6 is performed before step S7. In other embodiments, step S7 may be performed before step S6. In addition, in this embodiment, the method for manufacturing the sealing gasket includes step S6 and step S7. In other embodiments, the method may include only one of step S6 and step S7.

In addition, it is also possible to cool the intermediate product subjected to the secondary vulcanization before the above step S6, which is beneficial to making the molecular motions of the rubber relatively stable. The cooling method here may be natural air cooling, wind cooling, water cooling or the like. In other embodiments, cooling may be performed after step S6 or step S7.

Figure 5:
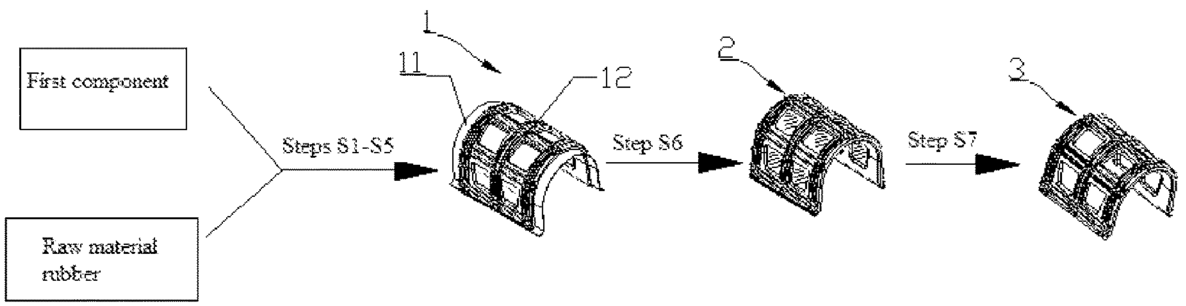
FIG. 5 is a schematic flowchart of the method for manufacturing a sealing gasket according to the fourth embodiment of the present application, showing the finished products corresponding to the steps.

With reference to FIG. 5, FIG. 5 is a schematic flowchart of the method for manufacturing a sealing gasket according to the fourth embodiment, showing the finished products corresponding to the steps.

With reference to FIG. 5, a first product 1 of step S1 to step S5 includes the first component 11 bonded with the raw material rubber and the vulcanized raw material rubber 12. In the method for manufacturing the sealing gasket according to the first embodiment and the third embodiment, the first product 1 may also be produced through step S1 to step S4. The first product 1 undergoes the step S6 to produce a second product 2, and the second product 2 undergoes the step S7 to produce the final sealing gasket 3.

Figure 6:
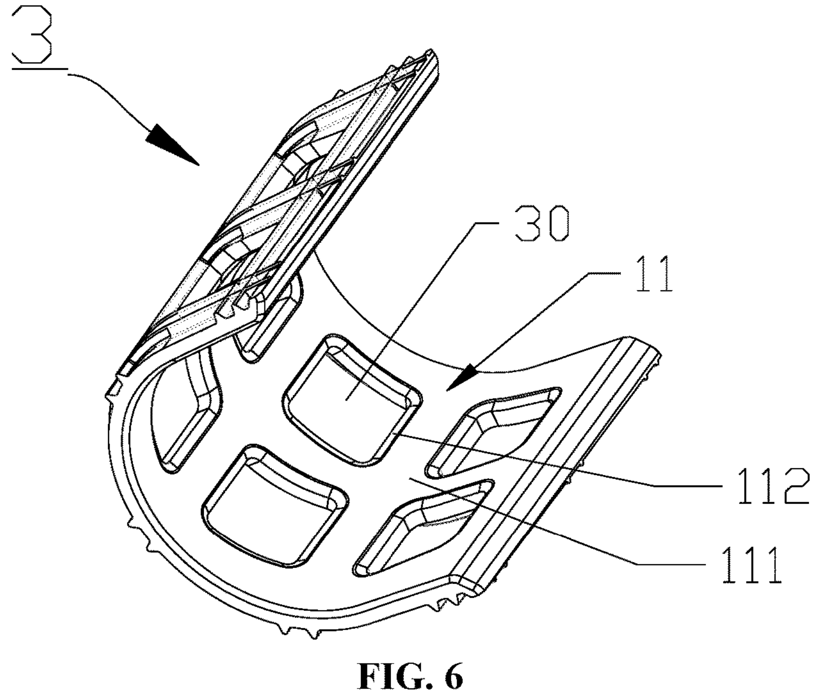
FIG. 6 is a schematic structural perspective view of a sealing gasket according to the present application.

With reference to FIG. 6, a lower surface of the first component 11 includes a main body surface 111 and a connecting surface 112. The connecting surface 112 connects a corresponding side wall of a through hole 30 at the first component. The connecting surface 112 is inclined. The corresponding side wall of the through hole 112 at the first component 11 is lower than the main body surface 111 along a thickness direction of the sealing gasket 3. This is beneficial to preventing rubbing of the moving part and the peripheral wall of the though hole 30 from hindering the movement of the moving part while the moving part is moving. In this embodiment, the connecting surface 112 is formed by a forming mold in step S4.

Figure 7:
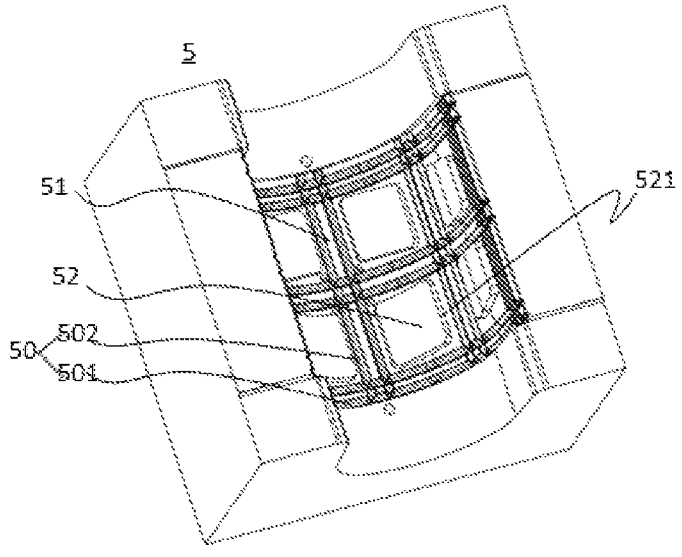
FIG. 7 is a schematic structural perspective view of an upper mold of a mold according to the present application.
Figure 8:
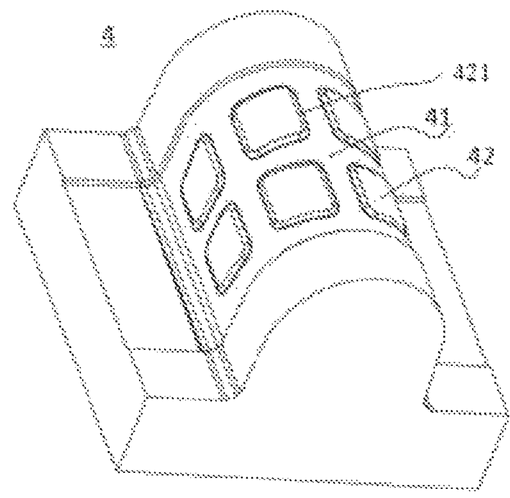
FIG. 8 is a schematic structural perspective view of a lower mold of a mold according to the present application.

The present application further discloses a mold which is used as a carrier for step S2, step G1, step S3, step G1' and step S4. With reference to FIG. 7 and FIG. 8, the mold includes a lower mold 4 and an upper mold 5, where the lower mold 4 and the upper mold 5 together define at least one inner chamber, and the inner chamber includes an accommodating cavity for accommodating raw materials required for forming the sealing gasket. The upper mold 5 is provided with a first main body surface 51 which is arc-shaped, and at least part of the first main body surface 51 forms at least part of an upper wall surface of the inner chamber of the mold. The mold further includes the lower mold 5, where the lower mold 4 is provided with a second main body surface 41 which is arc-shaped, and at least part of the second main body surface 41 forms at least part of a lower wall surface of the inner chamber of the mold. The "arc shape" mentioned here refers to a shape of approximate arc. On the one hand, the mold can be used as a carrier for manufacturing the sealing gasket through the above steps, and on the other hand, the main body of the sealing gasket manufactured by the mold is arc-shaped, so that a matching degree between the manufactured sealing member and the sealing member in actual use can be improved.

With reference to FIG. 7, the upper mold 5 further includes multiple first protrusions 52 and grooves 50. In other embodiments, the number of the second protrusions and grooves 50 may be one or more than two. Each first protrusion 52 protrudes from the first main body surface 51, each groove 50 is recessed from the first main body surface 51, and the groove 50 is located outside the first protrusion 52. The first protrusion 52 has a first inclined surface 521 which is located at a peripheral side of the first protrusion 52. The first inclined surface 521 connects a top surface of the first protrusion 52 and a root portion of the first protrusion 52. In an orthographic projection direction of the top surface of the first protrusion 52 to the root portion of the first protrusion 52, the orthographic projection of the top surface of the first protrusion 52 is located within the root portion of the first protrusion 52. In this embodiment, the groove 50 includes a first groove 501 and a second groove 502, where the first groove 501 is arranged along a length direction of the upper mold 5, the second groove 502 is arranged along a width direction of the upper mold 5, and the first groove 501 and the second groove 502 are arranged in a crisscross manner. In this embodiment, the first protrusion 52 is peripherally provided with part of the first groove 501 and part of the second groove 502, that is, the first groove 501 and the second groove 502 are arranged to surround the first protrusion 52.

With reference to FIG. 8, the lower mold 4 further includes multiple second protrusions 42. In other embodiments, the number of the second protrusions may be one or more than two. Each second protrusion 42 protrudes from the second main body surface 41. The second protrusion 42 has a second inclined surface 421 which is located at a peripheral side of the second protrusion 42. The second inclined surface 421 connects a top surface of the second protrusion 42 and a root portion of the second protrusion 42. In an orthographic projection direction of the top surface of the second protrusion 42 to the root portion of the second protrusion 42, the orthographic projection of the top surface of the second protrusion 42 is located within the root portion of the second protrusion 42. This enables the connecting surface 112 shown in FIG. 6 to be formed on the sealing gasket during molding.

It should be noted that, the above embodiments are only intended to illustrate the present application and not to limit the technical solutions described in the present application. Although the present specification has been described in detail with reference to the embodiments described above, it should be understood by those skilled in the art that, modifications or equivalent substitutions can still be made by those skilled in the art to the technical solutions of the present application without departing from the spirit and scope of the present application, all of which should be covered within the scope of the claims of the present application.

The invention claimed is:

1. A method for manufacturing a sealing gasket, comprising following steps:

S1: preparing raw material rubber and a first component, wherein the first component comprises a substrate and an adhesive coating layer, the adhesive coating layer is attached to an upper surface of the substrate, and the material of the substrate comprises a lubricating material;

S2: placing the first component in an inner chamber of a forming mold, wherein the forming mold comprises an upper mold, the upper mold is provided with a first main body surface which is arc-shaped, and at least part of the first main body surface forms at least part of an upper wall surface of the inner chamber of the forming mold; the forming mold further comprises a lower mold, wherein the lower mold is provided with a second main body surface which is arc-shaped, and at least part of the second main body surface forms at least part of a lower wall surface of the inner chamber of the forming mold; and the adhesive coating layer of the first component faces towards the upper mold of the forming mold;

S3: placing the raw material rubber in the inner chamber of the forming mold; and S4: vulcanizing the raw material rubber placed in the inner chamber of the forming mold, such that the raw material rubber and the first component are integrated with each other, wherein a lower surface of the first component comprises a main body surface and a connecting surface, the connecting surface connects a corresponding side wall of a through hole at the first component, and the connecting surface is inclined.

2. The method for manufacturing the sealing gasket according to claim 1, wherein the first component is flexible, the material of the substrate comprises polytetrafluoroethylene, and the first component has a thickness greater than or equal to 0.2 mm and less than or equal to 0.6 mm.

3. The method for manufacturing the sealing gasket according to claim 1, wherein in step S1, before coating the substrate with an adhesive, a surface treatment is performed on a surface of the substrate for coating; the adhesive coating layer comprises a base adhesive layer and a top adhesive layer, wherein the base adhesive layer is first coated on an upper surface of the substrate, and after the base adhesive layer is dried, the top adhesive layer is coated on a surface of the base adhesive layer and then the top adhesive layer is to be dried.

4. The method for manufacturing the sealing gasket according to claim 1, wherein in step S3, the method for placing the raw material rubber of a preset specification in the inner chamber of the forming mold comprises the following steps:

placing the raw material rubber of the preset specification into a tank of the forming mold, wherein the tank and the forming mold are located at different sides of a mold partition wall, and the tank is communicated with the inner chamber of the forming mold through a feed port; and extruding the raw material rubber into the inner chamber of the forming mold through the feed port.

5. The method for manufacturing the sealing gasket according to claim 1, wherein in step S3, the method for placing the raw material rubber of a preset specification in the inner chamber of the forming mold comprises the following steps:

placing the raw material rubber into a barrel of an injection molding machine, wherein the raw material rubber is pre-heated to a second preset temperature in the barrel of the injection molding machine, and the second preset temperature is lower than or equal to a first preset temperature in step S4; and injecting, by a screw of the injection molding machine, the raw material rubber in the barrel of the injection molding machine into the inner chamber of the forming mold to reach the preset specification.

6. The method for manufacturing the sealing gasket according to claim 4, wherein in step S4, the corresponding vulcanization time is defined to be a first preset time, and the corresponding preset temperature is defined to be a first preset temperature, wherein the first preset time is longer than or equal to 3 minutes and shorter than or equal to 5 minutes, and the first preset temperature is higher than or equal to 170° C. and lower than or equal to 200° C.

7. The method for manufacturing the sealing gasket according to claim 6, further comprising the following steps:

S5: placing a cooled intermediate product in a container, and heating the intermediate product placed in the container, wherein a bonded combination of the vulcanized raw material rubber and the first component is defined as the intermediate product; and maintaining the intermediate product placed in the container at a third preset temperature for a second preset time, so that the intermediate product is secondarily vulcanized, wherein the third preset temperature is lower than the first preset temperature.

8. The method for manufacturing the sealing gasket according to claim 7, wherein in step S6, the second preset time is longer than or equal to 2 hours and shorter than or equal to 4 hours, and the third preset temperature is higher than or equal to 140° C. and lower than or equal to 160° C.

9. The method for manufacturing the sealing gasket according to claim 1, wherein step S4 further comprises discharging air in the inner chamber of the forming mold at least once.

10. The method for manufacturing the sealing gasket according to claim 1, further comprising at least one of the following steps:

S6: removing waste material from a product of steps S1 to S4; and

S7: punching at a preset position of the product.

11. The method for manufacturing the sealing gasket according to claim 10, wherein in step 6, the product is placed in a stamping device, wherein the rubber layer of the sealing gasket is supported on and in contact with a lower stamping die, the first component faces towards an upper stamping die, and a through hole is formed at the preset position of the product through a stamping action of the upper stamping die towards the lower stamping die.

12. The method for manufacturing the sealing gasket according to claim 2, wherein in step S1, before coating the substrate with an adhesive, a surface treatment is performed on a surface of the substrate for coating; the adhesive coating layer comprises a base adhesive layer and a top adhesive layer, wherein the base adhesive layer is first coated on an upper surface of the substrate, and after the base adhesive layer is dried, the top adhesive layer is coated on a surface of the base adhesive layer and then the top adhesive layer is to be dried.

13. The method for manufacturing the sealing gasket according to claim 12, wherein in step S3, the method for placing the raw material rubber of a preset specification in the inner chamber of the forming mold comprises the following steps:

placing the raw material rubber of the preset specification into a tank of the forming mold, wherein the tank and the forming mold are located at different sides of a mold partition wall, and the tank is communicated with the inner chamber of the forming mold through a feed port; and extruding the raw material rubber into the inner chamber of the forming mold through the feed port.

14. The method for manufacturing the sealing gasket according to claim 12, wherein in step S3, the method for placing the raw material rubber of a preset specification in the inner chamber of the forming mold comprises the following steps:

placing the raw material rubber into a barrel of an injection molding machine, wherein the raw material rubber is pre-heated to a second preset temperature in the barrel of the injection molding machine, and the second preset temperature is lower than or equal to a first preset temperature in step S4; and injecting, by a screw of the injection molding machine, the raw material rubber in the barrel of the injection molding machine into the inner chamber of the forming mold to reach the preset specification.

15. The method for manufacturing the sealing gasket according to claim 2, wherein in step S3, the method for placing the raw material rubber of a preset specification in the inner chamber of the forming mold comprises the following steps:

placing the raw material rubber of the preset specification into a tank of the forming mold, wherein the tank and the forming mold are located at different sides of a mold partition wall, and the tank is communicated with the inner chamber of the forming mold through a feed port; and extruding the raw material rubber into the inner chamber of the forming mold through the feed port;

or, placing the raw material rubber into a barrel of an injection molding machine, wherein the raw material rubber is pre-heated to a second preset temperature in the barrel of the injection molding machine, and the second preset temperature is lower than or equal to a first preset temperature in step S4; and injecting, by a screw of the injection molding machine, the raw material rubber in the barrel of the injection molding machine into the inner chamber of the forming mold to reach the preset specification.

16. The method for manufacturing the sealing gasket according to claim 5, wherein in step S4, the corresponding vulcanization time is defined to be a first preset time, and the corresponding preset temperature is defined to be a first preset temperature, wherein the first preset time is longer than or equal to 3 minutes and shorter than or equal to 5 minutes, and the first preset temperature is higher than or equal to 170° C. and lower than or equal to 200° C.

* * * * *